United States Patent [19]

Coplan et al.

[11] Patent Number: 4,812,184
[45] Date of Patent: Mar. 14, 1989

[54] METHOD OF MANUFACTURING A HOLLOW FILAMENT SEPARATORY MODULE WITH CONSTRICTED BUNDLE END

[75] Inventors: Myron J. Coplan, Natick; Salvatore Giglia, Norwood, both of Mass.

[73] Assignee: Albany International Corp., Albany, N.Y.

[21] Appl. No.: 826,131

[22] Filed: Feb. 4, 1986

[51] Int. Cl.⁴ .......................... B01D 13/01; C08J 9/26
[52] U.S. Cl. ...................................... 156/84; 156/172; 156/198; 264/211.15; 29/902; 210/321.8; 210/321.89
[58] Field of Search ............ 210/321.8, 321.89, 321.2, 210/321.1, 323.2, 487, 488, 489, 490, 491, 496, 497.01, 497.1, 497.2, 500.23, 450; 264/103, 214, 232, DIG. 48, 209.7, 210.1, 209.2, 209.3, 209.4, 210.5, 211.15, 211.17, 235.6; 29/163.5 R, 163.5 F; 156/69, 84, 85, 155, 167, 178, 172, 198, 293, 308.6, 309.6

[56] References Cited

U.S. PATENT DOCUMENTS

| | | | |
|---|---|---|---|
| 3,761,552 | 9/1973 | Chill et al. | 264/103 |
| 3,787,265 | 1/1974 | McGinnis et al. | 264/103 |
| 4,045,851 | 9/1977 | Ashare et al. | 210/497.1 |
| 4,219,426 | 8/1980 | Spekle et al. | 210/450 |
| 4,329,229 | 5/1982 | Badnar et al. | 210/450 |
| 4,352,736 | 10/1982 | Ukai et al. | 210/497.1 |
| 4,361,481 | 11/1982 | Schnell | 210/500.23 |
| 4,396,510 | 8/1983 | Hsei | 210/450 |
| 4,400,276 | 8/1983 | Ballinger | 210/450 |
| 4,467,838 | 8/1984 | Rheaune | 264/103 |
| 4,572,446 | 2/1986 | Leonard et al. | 264/103 |
| 4,594,207 | 6/1986 | Josefiar et al. | 210/500.23 |
| 4,689,149 | 8/1987 | Kanna et al. | 210/450 |

Primary Examiner—Richard V. Fisher
Assistant Examiner—Wanda L. Millard
Attorney, Agent, or Firm—Kane, Dalsimer, Sullivan, Kurucz, Levy, Eisele and Richard

[57] ABSTRACT

A hollow fiber separatory module for separating fluids includes an annular hollow fiber separatory bundle encased in a pressure resistant shell. A region of the bundle is constricted so that the walls of the fiber are densified. Consequently, compaction of these fibers during operation is reduced. The constricted region is encapsulated by a potting material. Minimization of compaction aids in maintaining a sealing contact between the fibers and the potting material. "O" rings extending from the pressure resistant shell may seal the space between the pressure shell and the fiber bundle. The constricted portion may accommodate the "O" rings so that a pressure resistant shell of uniform outside diameter can be used. The fiber bundle may be constricted by heating, chemical treatment, applying pressure or application of tension during winding.

2 Claims, 4 Drawing Sheets

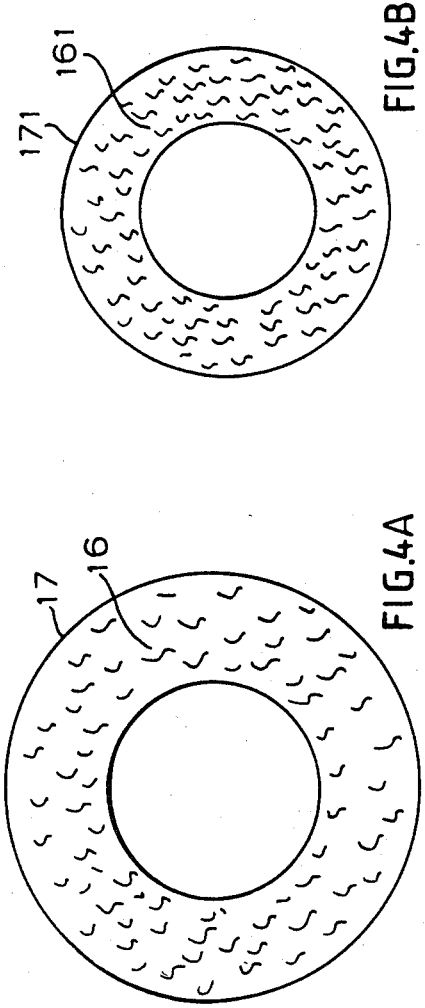
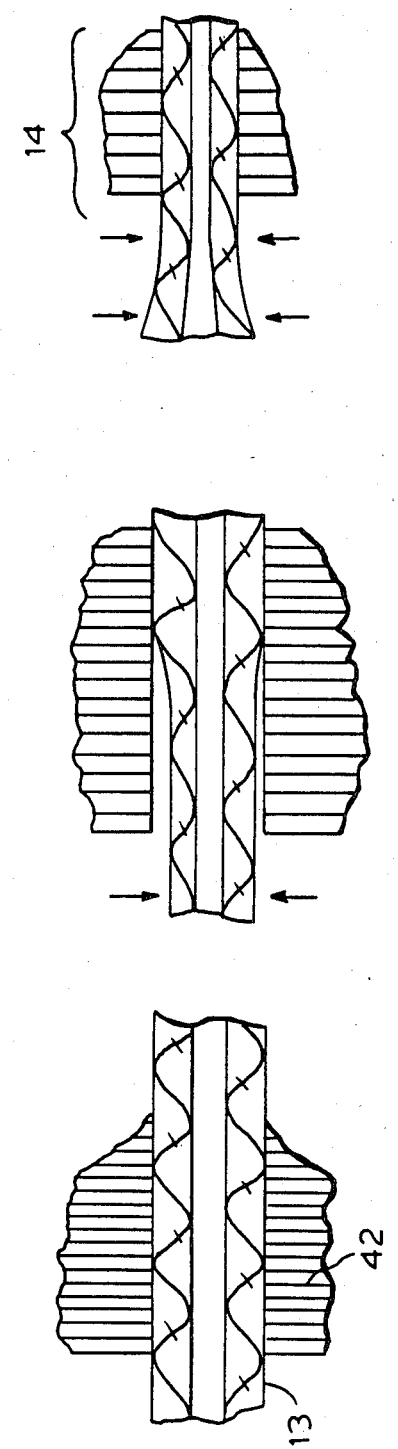

METHOD OF MANUFACTURING A HOLLOW FILAMENT SEPARATORY MODULE WITH CONSTRICTED BUNDLE END

FIELD OF INVENTION

The present invention relates to the design of a membrane element forming a separatory module, and more particularly to a hollow filament separatory module having a fiber bundle with a constricted portion making it possible to accommodate "O" ring grooves in an encapsulating potting mass, and comprising a membrane which is fully densified and highly resistant to pressure compaction in the potting zone.

BACKGROUND OF THE INVENTION

The use of membranes to effect separation of gas/gas, liquid/liquid, and liquid/solid mixtures and solutions has achieved general industrial applicability by various methods, among them being ultrafiltration, hyperfiltration, reverse osmosis, and dialysis. In general, membrane elements associated with these processes are contained in vessels called modules, comprising a shell having membranes arranged as to permit the introduction of a feed stream on the upstream face of the membranes, means for collecting permeate which passes through the membranes and emerges on their downstream faces, and means for keeping feed and permeate materials from commingling. Commonly assigned U.S. Pat. No. 4,207,192 discloses a hollow filament separatory module and method of fabrication, and is incorporated by reference herein.

In one method of forming a hollow fiber separatory element successive layers of fiber are wound upon one another in continuous helices of opposite hand eventually creating an annular bundle. The fiber assembly used as the principal example in the present disclosure for illustrative but not limiting purposes can be described as a relatively thick-walled annulus of a generally constant cross-section. Other methods of assembling hollow fiber bundles are known and may be contemplated as encompassed by the present invention. Likewise, certain features of the invention to be described are applicable to tubular, flat-sheet and spiral membrane configurations, and are contemplated as subjects of this invention.

Membrane assemblies are useful as pressure-driven separatory elements for multicomponent fluid feeds only if active areas of membrane are effectively sealed inside a pressure vessel by suitable means to prevent the commingling of pressurized feed fluid with the permeate fluid which passes through the membranes and emerges on the downstream side of their separation-functioning surfaces.

In the case of hollow fiber membrane elements, one approach to achieving the sealing-off of the pressurized feed relies on providing that one or both ends of the originally as-wound bundle is (are) encapsulated in a potting compound. This may be achieved for example by immersing the bundle end(s) in a polymerizable material in a mold. The outside diameter of the bundle may be just slightly smaller than the inside diameter of the mold. The result is to provide, eventually after suitable curing of the polymerizable material, a massive polymerized cylindrical plug encapsulating one or both ends of the bundle.

Fibers encapsulated in the plug are severed in such a way as to expose open fiber bores (See referenced U.S. Pat. No. 4,207,192). The cut ends of fibers, out of whose bores permeated fluid emerges during the separation process must be kept sealed away from the feed fluid acting on the fibers in the pressurized zone. This sealing may be conveniently achieved by the installation of "O" rings which act cooperatively between the outer surface of the potting plug and the inner surface of the pressure vessel containing the bundle.

In view of the fact that the outside diameter of the plug was formed larger than the outside diameter of the bundle, and there must be an "O" ring space between the cylindrical surface of the plug and the inside surface of the pressure vessel, it follows that there will be some, perhaps considerable, clearance between the surface of the bundle in the region of its active length and the inside of the pressure vessel is each of these is of a constant diameter. One expedient to overcome the excess clearance is to make the pressure shell with two diameters - one to accomodate the potted bundle end with "O" rings, the other to conform appropriately to the bundle diameter.

Important Features of the Invention

The invention to be described offers as one significant feature a superior alternative to the use of a pressure shell having two I.D.'s. It has been found that a region of the bundle at or near its end or ends to be potted can be deliberately shrunk at least with respect to bundle O.D. and under some circumstances when the bundle is an annulus with respect to both inner and outer annulus diameters. The effect of a controlled shrinkage by methods to be further described is that a region at or near one or each end of the bundle over a specified distance is reduced from the outer diameter of the main active region of the bundle by as much as 5 to 30 percent of the original diameter.

As a result of this reduction of the diameter of the bundle at or near the end or ends to be potted, it is now possible to encapsulate the fibers comprising the bundle with potting compound in a mold wherein the mold I.D. is no greater than the O.D. of the bundle in the region of active area. It is one object of this invention to provide a clearance between the I.D. of the mold and the surface of the bundle in its constricted region so that it is possible to form "O" ring grooves in the potting compound so that even the "O" rings when they lie in these grooves will have an O.D. not substantially greater than the bundle diameter at the active fiber area. Thus it is no longer necessary to provide a pressure shell having a step-region of larger diameter than the main length whose dimension is appropriate for the active area region of the annulus.

A second feature of this invention relates to the integrity of membrane potting seals. While it is to be exemplified largely by reference to the effect of this invention on hollow fibers, it will be recognized by those familiar with the art how it can be employed for other membrane configurations. Most membranes are not homogeneously dense through their thickness. They consist of a dense barrier layer at one surface surmounting a porous film which is as little as 50 percent dense. When the membrane element is a fiber bundle and is treated so as to form the bundle constriction in accordance with certain aspects of this invention, the fiber cross-section dimensions in the constricted region will also be reduced and the fiber wall densified. The most straightforward means for achieving both bundle constriction and fiber densification, as further discussed below, is through the application of heat. Other treatments such as by active chemicals or combinations of heat and chemicals may also be used to effect said shrinkage.

The significant benefit attained by the fiber densification during a bundle shrinkage treatment will be understood from the following. As has been stated, the cross-section of the hollow fiber wall will frequently consist of a thin veneer of material responsible for the permselectivity lying on a sponge-like matrix of polymer interlaced with open passages. Despite variations among different membranes, except under extremely rare conditions, the bulk of any membrane cross-section is significantly less than fully dense.

By the very nature of the service uses of the membrane this porous structure is inevitably subjected to compression stresses deriving from the applied fluid pressure difference required to effect the separation. It is well known that membranes suffer so-called compaction in use. For the most part the result of compaction has been observed as a loss in permeate flow rate as the pore system is partially collapsed (i.e. the membrane densifies).

What has not heretofore been recognized nor adequately controlled is the adverse influence that such compaction may have on the sealing of the membrane in the potting compound. The difficulty is illustrated in the accompanying figures using fiber pot-sealing as an example. When initially encapsulated in the sealing plug, the fiber will be tightly bound by the potting compound. However, under the compaction forces of the pressure applied in the separation process there will result both an instantaneous and a slower but continual reduction of the membrane thickness. In the active region of the fiber bundle this may cause only a somewhat lower overall permeation rate with or without a change of permselectivity. However, where the fiber leaves the active zone and passes into the potting plug, the compaction pressure which causes radial contraction of the fiber may well result in a loosening of the seal between the fiber and the material of the potting plug. Initial loosening may be followed over time by a progressive creeping of the compacted portion of fiber deeper into the potting so that eventually a leakage path is created for the high pressure fluid on the active part of the bundle to reach the permeate outlet region near the cut ends of the fibers. As a result, the separation effectiveness of the membrane element is impaired.

This adverse effect of compaction at the pot seal is eliminated by the practice of the present invention, where the application of heat or other treatment sufficient to cause a shrinkage of the bundle is accompanied by suitable densification of the fiber wall in the shrunken zone. In fact, in the preferred embodiment it is largely due to the densification and concomitant radial shrinkage of the fibers that there is any shrinkage of the bundle annulus, and the two effects occur concomitantly.

It is possible to produce on effect without the other if desired and appropriate aspects of the invention may be employed to achieve this. In the present embodiment, however, most often the magnitude of fiber radial shrinkage parallels bundle radial shrinkage.

For example, a group of fibers each of whose O.D. was initially $250\mu$ and which had a pre-heated porosity of 50 percent were wound into a bundle. A heat treatment was employed to constrict the bundle and at the constriction the fiber O.D. had been reduced to about $180\mu$. The fibers remained hollow but their walls had attained approximately 100 percent density. Meanwhile the bundle diameter which at its unshrunk position was 3 inches, was found to be about 2.5 inches in diameter at its constricted region.

BRIEF DESCRIPTION OF THE DRAWINGS

FIG. 4a is a cross-section of a single hollow fiber illustrating the initial untreated dimensions and typical distribution of porous and dense material.

FIG. 4b is a cross-section of a single hollow fiber illustrating the proportional changes in radial dimensions and typical distribution of porous and dense material due to compaction under operating pressure.

FIG. 4c is a cross-section of a fiber of the present invention taken from the constricted zone of the bundle illustrating the proportional changes in radial dimenions and elimination of fiber wall porosity due to the treatment.

FIG. 5a is a longitudinal section through the fiber illustrated in 4a as it lies partially in the potted zone and partially in the active zone before pressurization.

FIG. 5b is a longitudinal section through the fiber illustrated in 4b as it lies partially in the potted zone and partially in the active zone under pressurization.

FIG. 5c is a longitudinal section through the fiber illustrated in 4c as it lies partially in the potted zone and partially in the active zone during pressurization.

DETAILED DESCRIPTION OF THE PREFERRED EMBODIMENT

Figure 1:
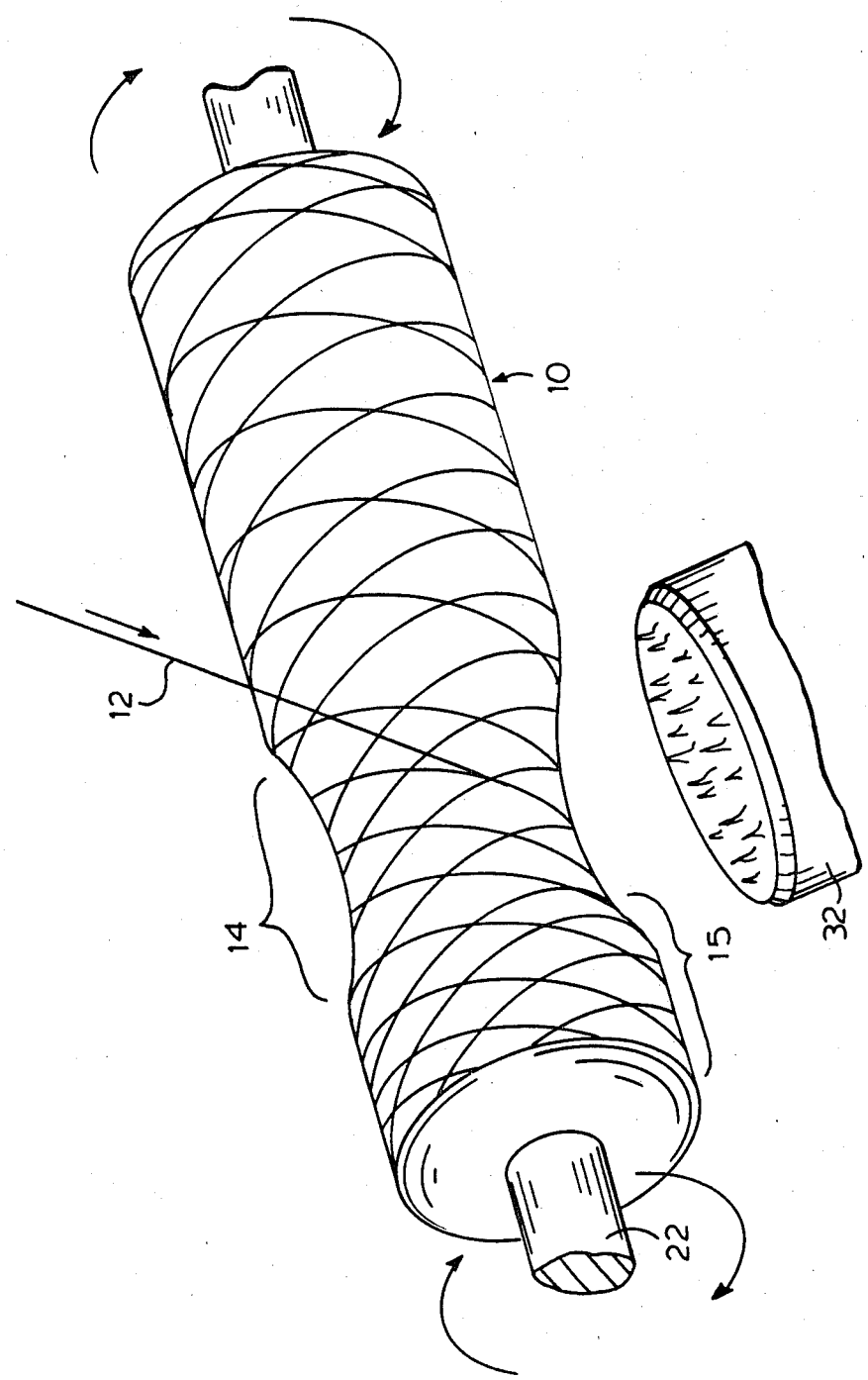
FIG. 1 is a perspective view of a partially wound bundle of the present invention heat-treated to provide a bundle constriction during winding.

FIG. 1 shows a typical bundle 10 of the present invention composed of fibers 12 being wound onto mandrel 22. There is also shown a nozzle 32 directing a stream of hot air at the bundle in the zone 14 which assumes a constricted diameter due to fiber shrinkage induced by the heating. A zone 15 is indicated which eventually will be the portion of the bundle encapsulated in potting compound.

Figure 2:
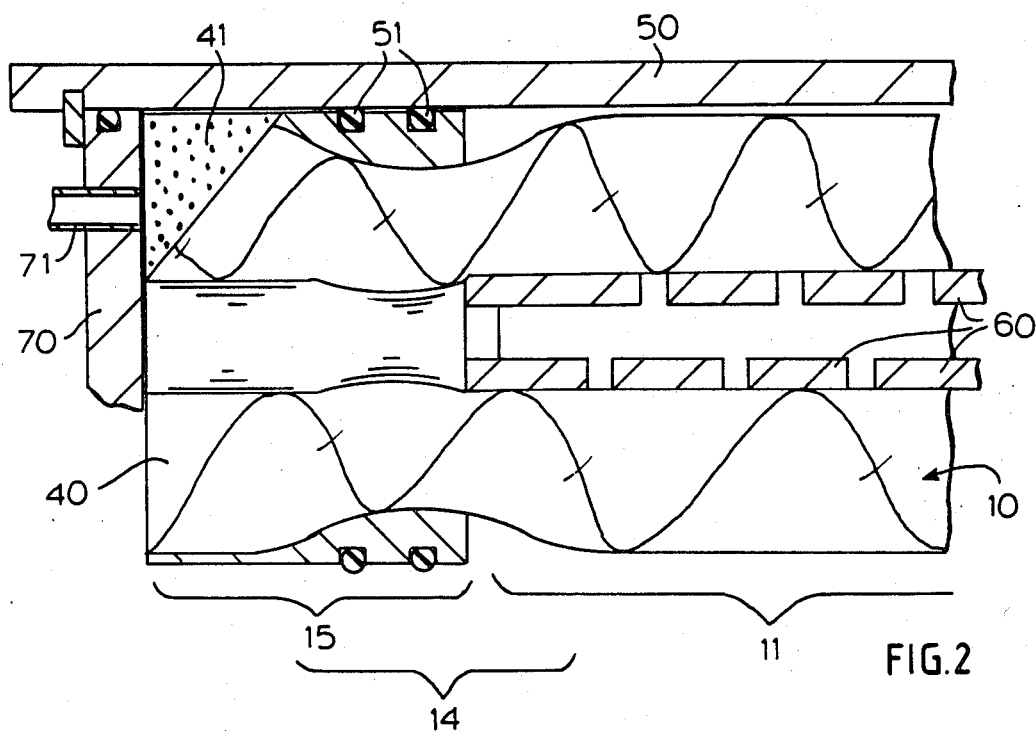
FIG. 2 is a cross-section view of the present invention through a potted bundle mounted in a partially broken away pressure shell illustrating the location and operation of the "O" ring grooves formed in the potting plug.

FIG. 2 shows a longitudinal section of a potted bundle produced according to the invention as it lies inside of a pressure vessel. As before, 10 is the fiber bundle annulus. The active region 11 is the portion of the fiber bundle which is presented to the pressurized feed. The constricted zone is 14 and the potted zone 15 is encapsulated in a plug of potting compound 40. An oblique plane 41 lying inside the potting plug has been produced by a slice made after the encapsulation process so that individual fibers have been sectioned and their bores opened. These bore openings communicate to an outlet 71 in one pressure shell endplate 70 and permeate generated during the separation process is removed via 71. Pressurized feed or concentrate may be admitted or removed by perforated tube 60. Not shown is a second access connection to the pressurized zone of the module which may be made through the pressure shell wall 50 or at an endplate (not shown) similar to 70 secured at the opposite end (not shown) of the pressure shell. "O" rings 51 lies in grooves formed in the encapsulating plug and provide the means for sealing pressurized feed fluid acting on the membrane bundle in region 11 form commingling with premeate collected at pot face 41.

Figure 3:
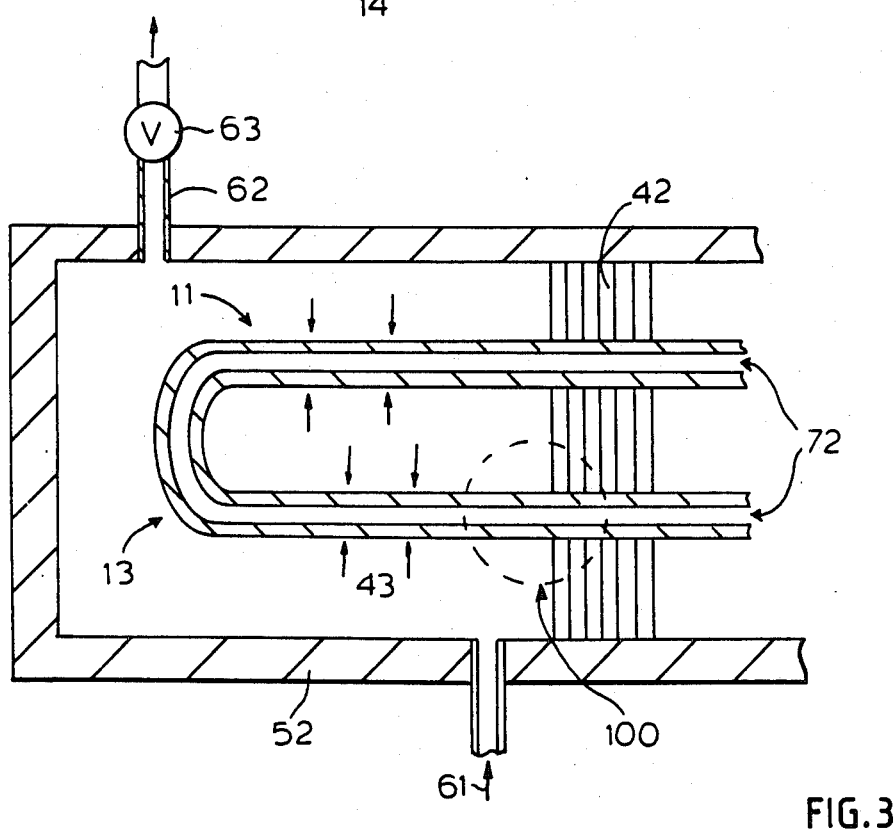
FIG. 3 is a schematic view, not of the present invention, but illustrating the operation of the present invention, of a single fiber loop installed in a pressure vessel sealed by a potting medium to isolate feed fluid under pressure in the active zone and prevent it from commingling with the permeate.

FIG. 3 is not an illustration of the present invention per se, but rather illustrates the operation of the present invention. It is generalized schematic depiction of a single fiber loop 13 embedded in potting 42. The region 11 is active zone, subjected to feed fluid under pressure indicated by the short arrows 43. Feed is admittted to pressure vessel 52 at 61 and is removed as concentrate at 62. Backpressure on the feed is maintained by a valve or other suitable flow controlling device 63. Permeate which is driven across the fiber wall into its bore emerges at the openings 72 at the ends of the bore. In FIG. 3 the potting compound 42 is shown as sealing directly to the inside surface of the pressure shell 52, although in the practice of the preferred embodiment of this invention this sealing would be accomplished by "O" rings. The circled region 100 is further depicted in FIGS. 5(a,b,c) and discussed hereunder.

FIG. 4a represents the cross-section of a single hollow fiber as it would appear before the time of winding. It is neither compacted by the pressure of the separation process nor densified by the treatment of the present invention. Its cross-section comprises an outer dense skin 17 of perhaps a few thousand Angstroms thickness surmounting a porous polymeric wall 16. A typical thickness for the porous wall might be 30 microns or less to 300 microns or more. Correspondingly, the O.D. might be 90 microns or less to 500 microns or more than the I.D. 30 microns or less to 200 microns or more. The porosity of the wall may range from 20-80%.

FIG. 4b represents the cross-section of the single hollow fiber of FIG. 4a after having been compacted under the pressure applied during operation of the membrane in a separation process. The diameter has contacted. The original dense skin has been thickened by compaction of that part of the wall adjacent to the skin 171 and the remaining regions of the wall 161 may also be reduced in porosity.

FIG. 4c reprseents the cross-section of a single fiber produced from the fiber illustrated at 4a by the heat shrinkage treatment of the present invention. Both the O.D. and I.D. of 4c are smaller than the precursor fiber illustrated at 4a. The original porosity is substantially, if not completely, eliminated and the density through the entire wall thickness closely resembles the original thin skin indicated as 17 in FIG. 4a. A fiber whose original unshrunk O.D./I.D. had been e.g., $250\mu/100\mu$ would have been shrunk to dimensions such as $180\mu/60\mu$, and the original wall density of about 0.5 would have increased to about 1.

FIG. 5a is an enlarged representation of the location indicated by 100 in FIG. 3. It represents a diagrammatic depiction of the state of a fiber such as 4a (prior to compaction and without preshrinking) as such a fiber 13 lies partially in the potting compound 42 and partially in the active zone. It is seen that the O.D. of the fiber is in tight contact with the encapsulating pot.

FIG. 5b is a depiction of the state of a fiber such as that shown at 5a will attain after some time under the influence of applied pressure during the operation of the separation element. In the region of the active zone and for some distance into the potted region the fiber has been compacted to a condition more or less resembling that depicted in 4b. It is clear that the contraction of the fiber diameter has created a crevice between the fiber O.D. and the potting plug, thereby introducing the potential for high pressure fluid leakage along the fiber surface further into the potting mass and eventually into the permeate collection region.

FIG. 5c depicts the condition of a fiber treated as per the present invention emerging from the potting plug into the active region. The span indicated as 14 corresponds to a fragmentary part of the region of the bundle where the shrinkage treatment has occurred corresponding to the position indicated by a similar numeral in FIGS. 1 and 2. The arrows represent the pressurization action of the feed fluid undergoing separation. At position 1 which is beyond the fully-shrunk zone the fiber is indicated as having achieved the reduced dimensions due to compaction such as is illustrated at 4b. However at the position marked 2 and continuing into the potting plug, the fiber condition is that depicted by 4c. Having been essentially fully densified and shrunk, the fiber in region 14 is relatively insensitive to the compaction pressure and remains in close sealing contact with the potting plug material.

Figure 6:
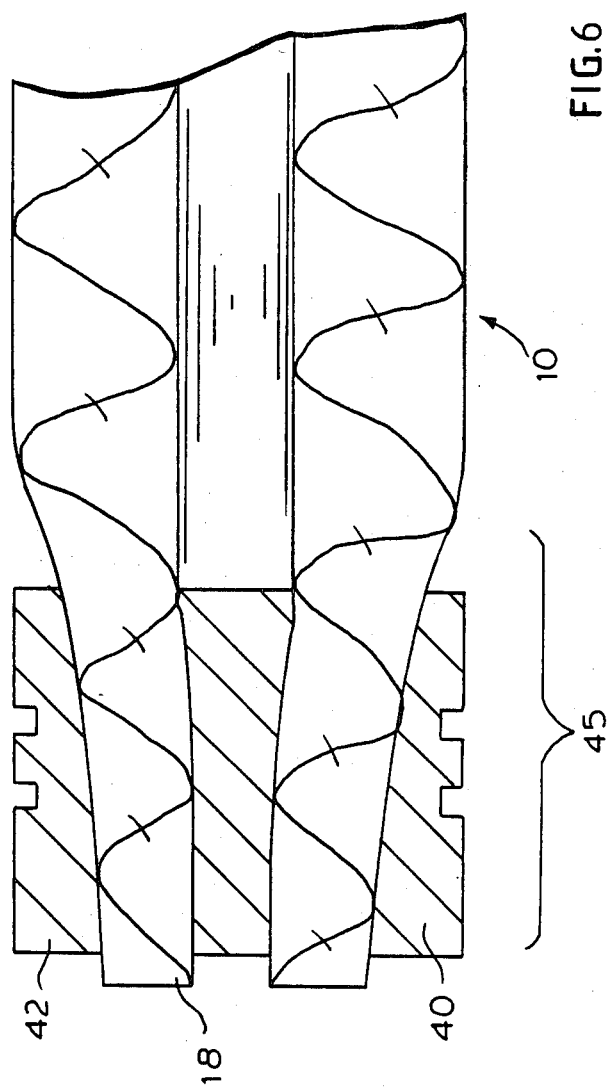
FIG. 6 is another embodiment of the bundle shrinkage condition.

FIG. 6 is an alternative embodiment in which the entire end of the bundle has been shrunk. Numerals 10 and 40 have the same meaning as in FIG. 2. Numeral 45 represents a constricted zone. The bottom surface 42 of the potting plug was formed during molding by providing a mold end-plate with an annular cavity permitting the shrunken bundle extremity to protrude thereinto. After potting the constricted bundle end 18 which extends beyond the pot end plane 42 may be sliced off to expose open fiber bores.

From the foregoing descriptions the intent and purpose of the present invention should be clear. One familiar with the art will realize that the desirable effects may be experienced over a wide range of membrane polymer types, for example the polysulfones, polyamides, cellulosic esters, acrylics, vinyl materials and numerous others. It will also be clear to one familiar with the art that the advantages of the present invention may be realized either if the rejection barrier layer is chemically similar to the porous region of the polymer support layer such as in the so-called asymmetric membrane style or if the rejection barrier is formed of a material different from that of the porous support layer such as in a typical composite membrane. The process can also be employed with the so-called occlusively coated membranes of U.S. Pat. No. 4,230,463.

It will also be understood that the salutary effects of the invention may be accomplished whether the rejection barrier layer is on the external surface of the fiber or on the internal surface adjacent to the bore. In addition, it is understood that some aspects of the invention could advantageously be practiced in the fabrication of element assemblies comprising membranes without a detectable separation barrier. Such a membrane element may be employed as such or after having been coated with a permselective barrier layer in a step performed following the process taught by this invention.

While the foregoing discussions have described the invention as it would be applied to hollow fibers, it will be understood that in some of its aspects the invention could be applied to tubular, flat sheet or spiral wound membranes.

It will be understood that the geometric constriction of a fiber bundle to provide a zone in a potted region suitable for the forming of "O" ring grooves can be achieved by a variety of means. The means illustrated in the foregoing discussions assume winding on a mandrel of constant diameter using a common ratio of traverse and rotation rates over the length of the bundle at any wrap and the bundle constriction has been described up to this point as being achieved by the application of heat. While this is our preferred embodiment, other alternatives may be employed. For example, the constricted zone can be produced by winding on a mandrel having different diameters. Alternatively, the ratio of traverse to rotation may be regularly and repeatedly changed as the traverse point moves across the bundle region to be constricted. As another alternative, there may be applied against the surface of the bundle a presser roll at the region of constriction which forces the fiber wraps into a tighter packing density. As still another alternative, the tension applied to the fiber as it wraps onto the bundle may be controllably and regularly increased as the fiber passes across the bundle region to be constricted. It is clear that each of the methods alone or in combination with one or more of the others can be employed. Moreover, any one or several of these methods in combination can be employed along with some such membrane densification method as will now be described.

It will be understood by those familiar with the chemical physics of polymers that their mechanical stability is a function of temperature and chemical environment. A porous polymer membrane material accordingly is subject to structural or morphological changes upon sufficient heating, or exposure to plasticizing materials or combinations thereof. Generally speaking the porosity of a polymeric membrane material will tend spontaneously to collapse into a fully dense condition if it is heated to some elevated temperature which may be higher than its glass transition temperature.

Under the influence of this heating there are shrinkage forces set up at the molecular level which will tend to draw the polymer material into densified masses thereby eliminating the pores and causing a net bulk shrinkage. The presence of plasticizers or solvents or their vapors will facilitate such a densification. It should be understood, therefore, that when in the disclosure of the aspect of this invention relating to fostering fiber compaction resistance reference has been made to applying heat as a shrinking influence, this could also have the meaning of applying heat in the presence of facilitating chemical agents (i.e. solvents, their vapors, plasticizers, etc). In fact, under certain conditions the application of solvents, their vapors, or plasticizers may produce the desired fiber radial contraction without the application of heat.

With respect to the application of heat, the discussion heretofore has taught that a stream of air blowing at the bundle during winding may be used. It should be understood that the heat can be applied during winding by electromagnetic radiation including R.F., microwave, or I-R, by a blanket of stagnant hot air, by hot liquids or vapors otherwise either inert to the fiber or acting as a plasticizer. For example, steam may be the source of both heat and condensed water which is often a latent plasticizer for many membrane polymers. Alternatively, heated easily removable membrane-inert liquids may be used.

Finally, although the treating process has been hereinabove described as being carried out during the winding, it is possible to produce the desired bundle (and fiber) shrinkages on finished wound bundles. For example, the fully-wound bundle may be installed in a heated cup and left in contact therewith for a sufficient time to cause a thorough heating of the fibers at the bundle end and thereby effectuate the desired result. A similar approach can be employed wherein a heated liquid is contained in such a cup. Alternatively, penetrating electromagnetic irradiation devices can be employed by such means as inserting one electrode in the hollow of the annulus and mounting another around the surface of the bundle.

We believe that by virtue of the foregoing discussions and illustrations we have given sufficient evidence of the value of the invention and its methods of operation to claim:

What is claimed is:

1. A new method of manufacturing a fiber bundle separatory module comprising the steps of:
   forming an annular bundle of resinous hollow fiber;
   treating a predetermined region of the annular bundle with a plasticizing medium to cause densification of the individual fiber walls and to create a constricted region of smaller diameter in the annular bundle;
   encasing the fiber bundle with a potting material at said predetermined region; and
   inserting the potted fiber bundle into a pressure resistant shell.

2. The method according to claim 1 wherein said plasticizing medium is heat.

* * * * *